United States Patent

[11] 3,622,817

[72] Inventor La Var King Isaacson
 Salt Lake City, Utah
[21] Appl. No. 11,500
[22] Filed Feb. 16, 1970
[45] Patented Nov. 23, 1971
[73] Assignee The University of Utah

[54] SHOCK INDUCED COMBUSTION AND IONIZATION MHD APPARATUS
3 Claims, 2 Drawing Figs.

[52] U.S. Cl. .................................................... 310/11
[51] Int. Cl. .................................................. H02m 4/02
[50] Field of Search ........................................ 310/11

[56] References Cited
UNITED STATES PATENTS

| | | | |
|---|---|---|---|
| 3,337,759 | 8/1967 | Damon ........................ | 310/11 |
| 3,368,088 | 2/1968 | Krzycki et al. ................ | 310/11 |
| 3,508,090 | 4/1970 | Crampton et al ............ | 310/11 |

OTHER REFERENCES

A Study of Supersonic Combustion by Gross and Chinitz; Journal of the Aero/Space Sciences, July 1960, pp. 517–524.

*Primary Examiner*—D. X. Sliney
*Attorney*—Clarence W. Martin

ABSTRACT: The invention disclosed herein relates to the conversion of chemical energy contained in fossil fuels and other combustible products into electrical energy by the extraction of electrons from ionized combustion products as they pass through the magnetic field of a magnetohydrodynamic electric generator, all of which occurs in the absence of seeding by cesium or other elements. Combustion and ionization of the combustible products is accomplished by passage of the combustible products through a shock wave created by the change in flow of the gaseous fuel-air mixture from supersonic flow in the expansion zone of an expansion nozzle to subsonic flow in the region of the magnetohydrodynamic electric generator. Particulate matter, either combustible or noncombustible, ia also introduced into the gaseous flow upstream of the shock wave in order to subject the particulate matter to a nonequilibrium thermal shock upon the surface of the particles of the additional production of free electrons which are then extracted by the magnetohydrodynamic electric generator.

PATENTED NOV 23 1971

3,622,817

INVENTOR.
L. KING ISAACSON

BY *Clarence W. Martin*

AGENT

SHOCK INDUCED COMBUSTION AND IONIZATION MHD APPARATUS

Historically, the production of commercial electrical energy from chemical energy has been achieved by conversion of chemical energy into heat energy which in turn is utilized generally as steam by a mechanical device which is the prime mover for an electric generator. The inherent inefficiencies of this method are obvious when one observes the series of energy changes that the original chemical energy must pass through in order to become electrical energy. Energy is lost in inefficient conversion of chemical to heat energy, heat losses, and the inherent inefficiencies within the electromechanical generation of electricity. It would be a significant contribution to the art of generating electrical energy if an economical system of converting chemical energy to electrical energy were to be developed. Such an invention is herein disclosed.

Generally the direct conversion of chemical energy into electrical energy is accomplished by passing an ionized gas through the magnetic field of a magnetohydrodynamic electric generator (hereinafter referred to as an MHD electric generator) for the extraction of electrons from the ionized gas. Ionization of the gas is accomplished by heating the gas to a high temperature either by external heat sources or combustion of the gas itself. Due to the temperature limits of the presently available materials of construction, lower gas temperature may be utilized if the gas is first "seeded" with a seed material such as cesium to aid the flow of electrons from the gas as it passes through the magnetic field. To be economical, this latter system must provide some means for the almost total recovery of the seed material. Additionally, it has been proposed that an electric field be imposed on the gas to raise the temperature of the electrons of the gas without raising the temperature of the gas itself to give the gas a conductivity corresponding to a higher gas temperature. This latter method results in the inefficient utilization of electrical energy and heavy erosion of the electrodes that supply the electric field.

In the present invention, combustible materials which are both relatively inexpensive and readily available are used. These materials are coal, coke, and/or oil shale in a finely divided state and supported in a stream of combustible and compressible fluid such as methane, hydrogen, or natural gas. Oxygen for the support of combustion of these materials is supplied by a stream of heated, high pressure air into which the combustible materials are introduced. To prevent preignition of the combustible mixture, the two systems are intermixed in the vicinity of the throat of an expansion nozzle. The two system mixture expands in the expansion nozzle and reaches a supersonic velocity on the order of about 3 to 5 Mach. As the mixture exits the expansion zone of the expansion nozzle, the flow returns to subsonic velocity and creates a zone of high compression or a shock wave separating the two regions of flow. As the combustible fuel passes through the shock wave thus created, it is subjected to a thermal shock sufficient to initiate combustion of the combustible fuel. This form of high-temperature combustion also ionizes the gaseous mixture so that electrical energy can be extracted from the system by passage of the combustion mixture through the magnetic field of a MHD generator. The time required for combustion of the particulate matter extends the zone of combustion down the length of the MHD generator for the extraction of additional electrons from the ionized stream. In addition, thermal shock imposed by the shock wave upon the surface of the particulate matter produces copious amounts of electrons on the surface of the particles which exceed by factors of $10^4$ to $10^6$ the free electron densities produced upon the same particles at thermal equilibrium. It is proposed that these additional electrons will also be extracted by passage of the particulate matter through the MHD generator.

It is an object of the present invention to provide a means for the conversion of chemical energy into electrical energy by the ionization of readily available fossil fuels by shock-induced combustion and subsequent passage of the ionized combustion products through a magnetohydrodynamic electric generator.

It is another object of this invention to generate electrical energy by subjecting particulate materials in the gas stream of a MHD generator to a nonequilibrium thermal shock on the surface of the particles for the release of additional electrons.

It is still a further object of this invention to provide a combustible particulate matter which will be subjected to a thermal shock upon its surface for the production of additional free electrons and to extend the zone of the combustion down the length of the magnetohydrodynamic electric generator.

These and other objects will be more fully apparent from the following drawings and description.

Figure 1:
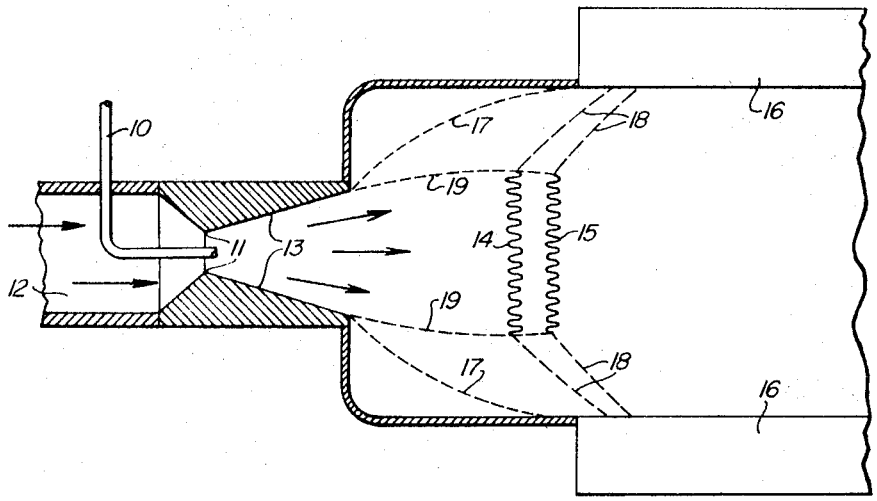
FIG. 1 is a cross-sectional view of the expansion nozzle and shock wave region of the magnetohydrodynamic electric generator illustrating what is believed to occur in these regions.

Referring to FIG. 1, particulate material suspended in a stream of compressible and combustible fluid is introduced by means of a conduit 10 into the throat region of a nozzle indicated at 11 where the stream from conduit 10 intermixes with high-pressure, high-temperature air and/or gaseous fuel entering through conduit 12. Arrows indicate the direction of flow.

Expansion of the compressible fluids mixture in an expansion zone 13 of the nozzle causes the particulate matter, gaseous fuel, and air mixture to accelerate to velocities on the order of about 3 to 5 Mach. Upon exit from expansion zone 13 of the nozzle, the velocity of the mixture returns to subsonic flow and creates a standing shock wave 14 between the two regions of flow. Passage of the mixture through standing shock wave 14 subjects the mixture to a thermal shock sufficient to initiate combustion of the combustible gases and materials in the mixture. Combustion of the combustible matter creates a combustion front 15 downstream of the standing shock wave 14. The thermal shock of standing shock wave 14 and combustion of the combustible materials in the mixture causes the ionization of the mixture with the result that electrons are extracted from the ionized mixture by passage of the ionized mixture through a convention MHD electric generator 16. Continued combustion of combustible particulate matter downstream of combustion front 15 extends the zone of ionization down the length of the MHD generator for the extraction of additional electrons from the ionized stream.

Combustible and noncombustible particulate matter is subjected to a nonequilibrium thermal shock upon its surface upon passage through the standing shock wave 14 and the combustion front 15 with a resultant production of copious amounts of free electrons upon the surface of the particles which electrons are extracted by the MHD generator 16.

A jet boundary 17, a reflected shock wave 18, and an intercepting shock wave 19 are shown in dashed lines to indicate representative positions in relation to shock wave 14 and combustion front 15 at a given velocity of materials in the region of the exit from the expansion nozzle of the MHD electric generator. Velocity changes would, of course, change the relative positions of all boundaries and waves.

Figure 2:
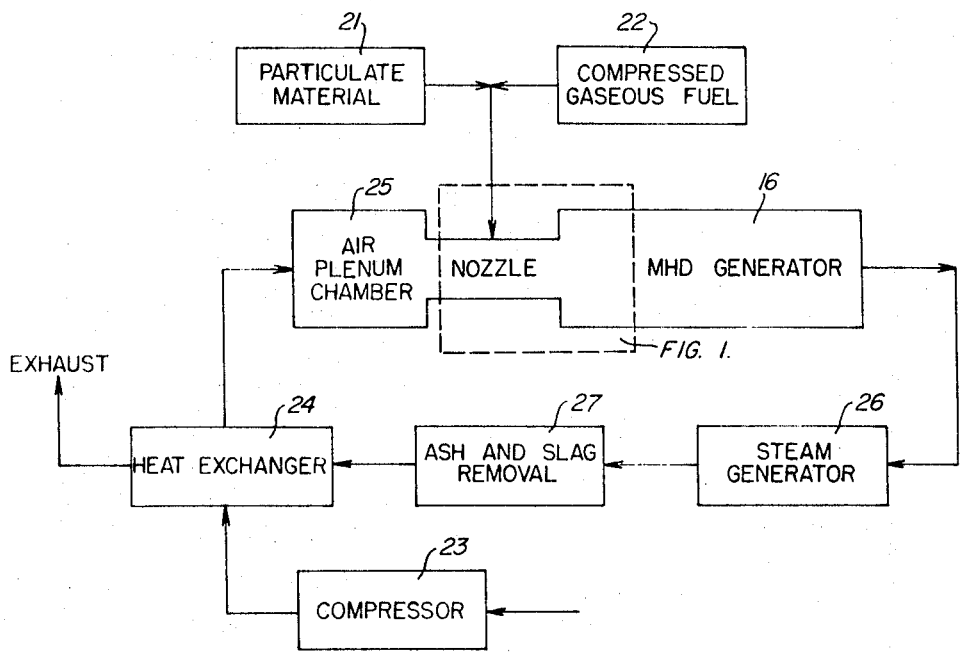
FIG. 2 is a schematic of a layout of a magnetohydrodynamic electric generator system.

Referring to FIG. 2, particulate material is combined with a compressible fuel in such a manner that both enter the throat of the expansion nozzle and therein combine with heated, high-pressure air prior to passage into the expansion zone of the nozzle. The air is suitably compressed in compressor 23 wherein it is also heated by the compression process. Additional heat is added to the air by passage through a heat exchanger 24. Settling of the air prior to introduction into the nozzle is accomplished in plenum chamber 25.

The magnetohydrodynamic (MHD) generator is indicated generally at 16.

Combustion products leave the MHD zone where the electrons have been extracted and pass through a steam generator 26 for the production of steam which is then utilized in a conventional steam powered electric generator system (not shown). Solid and particulate waste products are extracted from the exhaust stream in an ash and slag precipitator 27. Prior to exhaust to the atmosphere, remaining heat in the exhaust gas is extracted in heat exchanger 24 for heating the inlet air.

I claim:

1. A method of extracting electrical energy from particulate and gaseous materials passed through a shock front, said method comprising the steps of:
   a. intermixing
      1. a stream of elevated pressure, compressed fluid comprising particulate matter and combustible gases with
      2. a stream of elevated temperature, elevated pressure compressible fluid having an oxygen content at least equal to that of air;
   b. accelerating said intermixed streams to a supersonic velocity in an expansion zone of an expansion nozzle;
   c. decelerating said intermixed streams to create a shock wave therein;
   d. ionizing said intermixed streams by said shock wave;
   e. subjecting said particulate materials in said intermixed streams to a nonequilibrium thermal pulse in said shock wave;
   f. passing said ionized stream through a magnetic field of a magnetohydrodynamic electric generator; and
   g. extracting electrical energy from said ionized stream by said magnetohydrodynamic electric generator.

2. A method of extracting electrical energy as defined in claim 1 wherein the particulate matter is coal, oil shale, coke, or noncombustible particulate matter eight singly or in combination.

3. In a method of extracting electrical energy as defined in claim 1 wherein said combustible fluid is comprised of methane, hydrogen, or natural gas either singly or in combinations.

\* \* \* \* \*

UNITED STATES PATENT OFFICE
CERTIFICATE OF CORRECTION

Patent No. 3,622,817    Dated November 23, 1971

Inventor(s) La Var King Isaacson

It is certified that error appears in the above-identified patent and that said Letters Patent are hereby corrected as shown below:

Column 4, line 11, "eight" should read -- either --.

Signed and sealed this 24th day of October 1972.

(SEAL)
Attest:

EDWARD M. FLETCHER, JR.
Attesting Officer

ROBERT GOTTSCHALK
Commissioner of Patents